Aug. 28, 1934.  W. G. HOELSCHER  1,971,955
REVERSING GEAR AND CLUTCH MECHANISM
Filed Sept. 30, 1932  3 Sheets-Sheet 1

INVENTOR
William G. Hoelscher
BY
Wood & Wood
ATTORNEYS

Aug. 28, 1934.   W. G. HOELSCHER   1,971,955
REVERSING GEAR AND CLUTCH MECHANISM
Filed Sept. 30, 1932   3 Sheets-Sheet 2

INVENTOR
William G. Hoelscher
BY
Wood & Wood ATTORNEYS

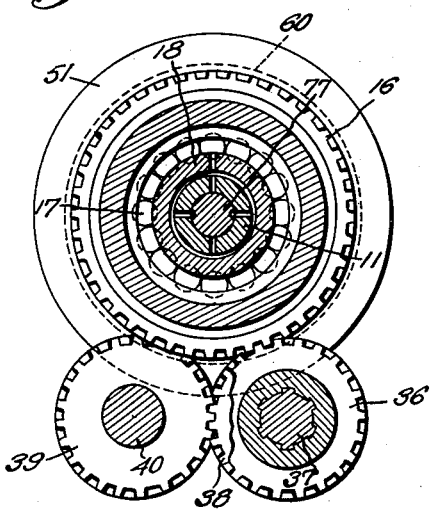
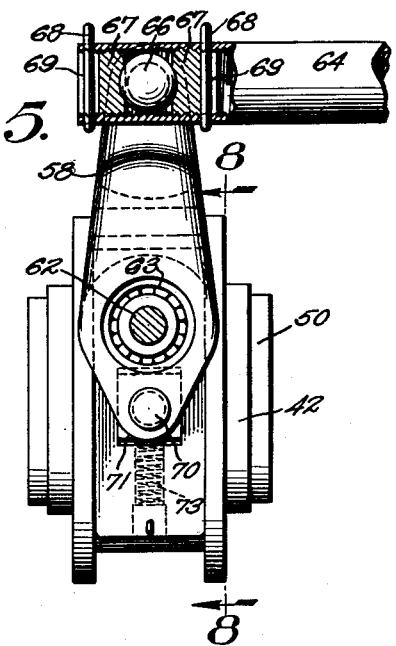
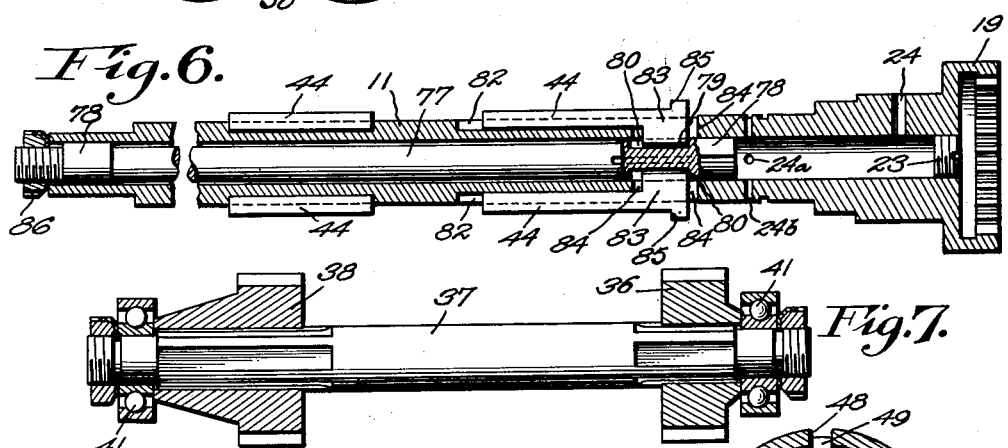
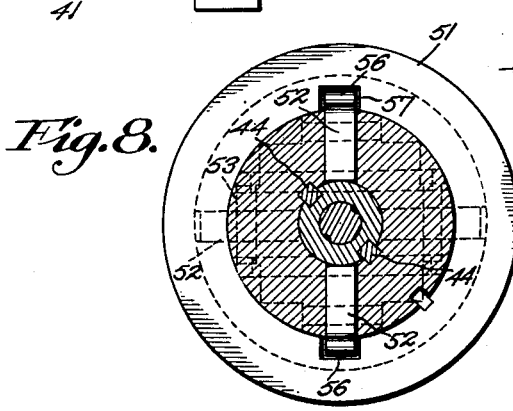
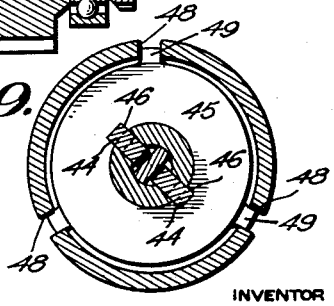

Patented Aug. 28, 1934

1,971,955

UNITED STATES PATENT OFFICE 1,971,955

REVERSING GEAR AND CLUTCH MECHANISM

William G. Hoelscher, Norwood, Ohio, assignor to The American Tool Works Company, Cincinnati, Ohio, a corporation of Ohio Application September 30, 1932, Serial No. 635,620

5 Claims. (Cl. 74—377)

This invention relates to power transmission and is particularly directed to an improved reversing gearing mechanism of that type wherein friction clutches are included for coupling the power to a transmission shaft by alternate clutch connection to reversely rotating driving gears. In connection with the present improvements, reference is made to Patent No. 1,855,882 issued to W. G. Hoelscher et al. on April 26, 1932, which patent includes structure to which the present improvements are applied.

It is an object of this invention to provide improved adjusting devices for the clutch for efficient driving connection by application of the proper clutching pressures. These pressures are maintained generally uniform by improved means for resetting the parts of the clutch mechanism to accommodate for wearing of the clutch plates, which adjusting means are incorporated at a common and readily accessible point of the mechanism exteriorly thereof.

It is a further object to provide that the clutch parts for the respective directions of drive may be independently adjusted to bring about uniformity of clutching pressures applied for the respective directions, particularly in mechanism where a common clutch operating lever is incorporated for accomplishing the reverse directions of drive.

Another object is to provide an improved reversing gear transmission, which is vibrationless and consequently exceedingly quiet despite the extremely rapid speeds at which certain of the reversing gears must rotate.

A further object is to provide an improved form of operative connection to the clutch shifting lever by means of which it is possible to accomplish the reversing of drive without great effort in the handling of the shifting lever.

Other objects and further advantages will be more fully apparent from a description of the accompanying drawings, in which:

Figure 2 is a sectional view taken on line 2—2, Figure 1, illustrating the general arrangement of the reversing gear parts showing the clutch shifting lever and illustrating the end of a lathe headstock to which the reversing gear is applied.

Figure 3 is a sectional view taken on line 3—3, Figure 1, showing the shifting mechanism of the reversing clutch and the brake therefor.

Figure 4 is a sectional view taken on line 4—4, Figure 1, showing the gearing arrangement for reversal of the drive.

Figure 5 is a side view of the clutch operating means detailing the universal joint connection to the clutch operating lever for ease in operation.

Figure 6 is a longitudinal sectional view of the axial support and driven shaft of the reversing gear illustrating the same removed from the mechanism and showing the parts contained therein for adjusting the clutch.

Figure 7 is a view of the reversing shaft showing it removed from the mechanism and parts carried thereby in section.

Figure 8 is a sectional view taken on line 8—8, Figure 5, detailing the arrangement of the clutch fingers.

Figure 9 is a sectional view taken on line 9—9, Figure 1, detailing the arrangement of the clutch plates of the reversing gear mechanism.

Figure 1:
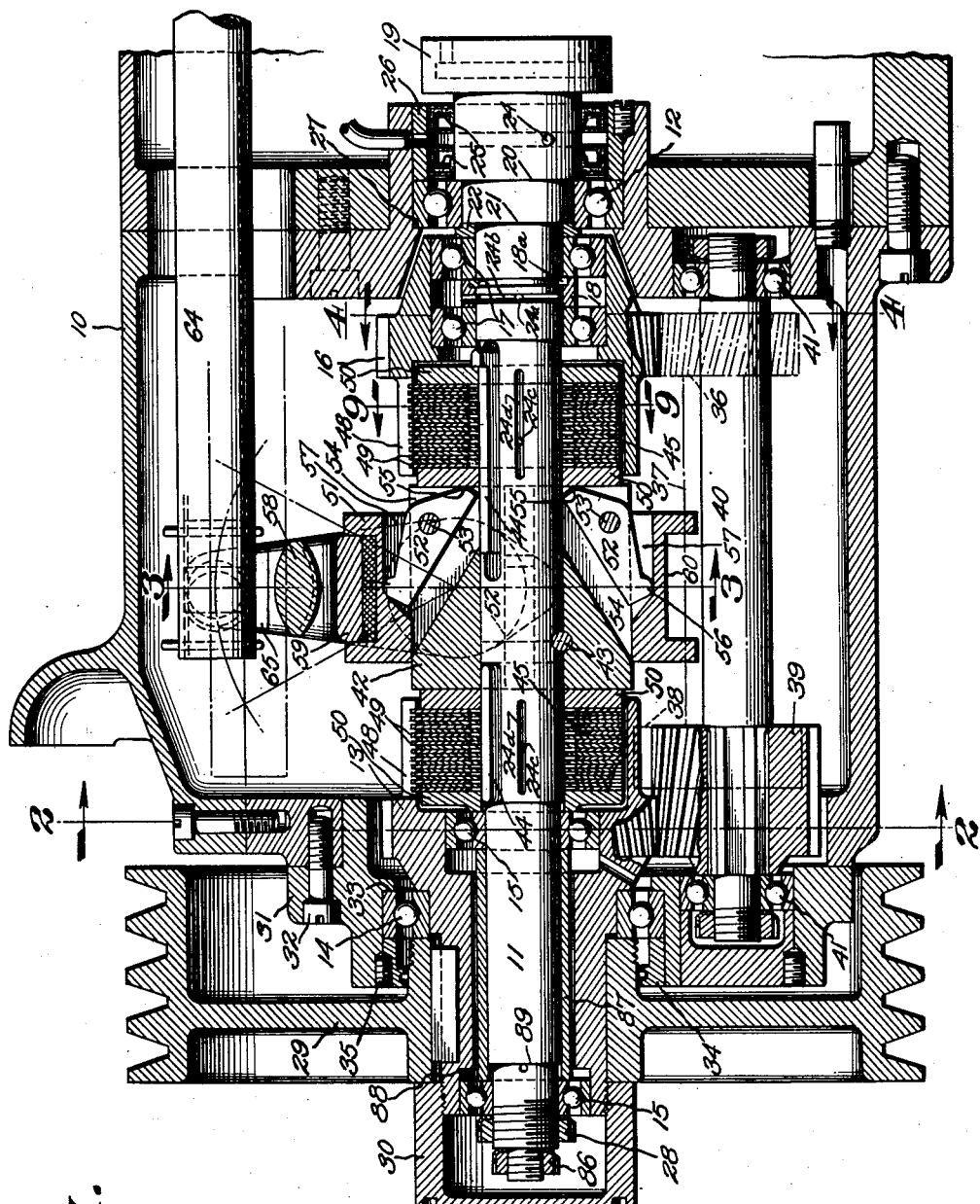
Figure 1 is a sectional view taken longitudinally of the axis of rotation of the various parts of the reversing gearing for generally illustrating the improved transmission and adjustment means.

The driving parts for the present mechanism consist of a pair of gears rotatively mounted, one of which is directly driven by means of a pulley and the other of which is driven from the first through an intermediate gear train for reversing the direction of drive thereto. A driven shaft and axial support is provided and a clutch is associated with the mechanism between the gears for selectively connecting the gears to the driven shaft. The means for shifting the clutch also operates a brake mechanism for braking the momentum of the brake shaft after the drive has been disconnected. The clutch adjusting means are provided at a common and conveniently accessible point in the mechanism.

*Mounting and relation of driving and driven elements*

Referring specifically to the drawings, a casing or housing for the reversing gearing is indicated at 10. This casing is a fabricated construction, its exact structure depending on its relation to the particular environment in which it is designed to transmit power. Its opposite walls are suitably apertured for journalling a driven shaft 11 extending entirely through the casing. This driven shaft is of tubular or sleeve form and is mounted at one end in a ball bearing 12 located within one end wall and at its opposite end is mounted in a driving gear 13, which gear is rotatably mounted in the casing, having for this purpose a bearing hub journalled within a ball bearing 14 suitably secured within the wall of the casing.

The driving gear 13 is loosely rotatably mounted on the driven shaft by means of bearings 15—15.

The hub of the gear 13 extends beyond the confines of the casing and the gear is located within the casing. A second driving gear 16 or reversely rotated gear is loosely rotatably mounted on the driven shaft through the medium of ball bearings 17—17, spaced apart by means of a spacer sleeve 18, this bearing and sleeve assembly being engaged against a shoulder at the inner end of the gear bore.

The driving gears 13 and 16 are spaced apart on the driven sleeve or shaft and the clutching mechanism is located on the driven shaft between these gears for alternately clutching the same to the driven shaft. The hub of the gear 16 is loosely disposed within the bore in the end wall of the casing. The drive is delivered from the end of the driven sleeve to a shaft section (not shown). For the purpose of connecting the driven shaft to the shaft section, the shaft includes a headed end 19 extended beyond the hub or shaft journal of the casing. This headed end (see Figure 6) is hollow and includes internal circumferentially arranged teeth which are engageable over the coupling teeth of the driven shaft section.

The driven shaft includes a pair of shoulders 20 and 21, formed by enlarged portions of the shaft, the shoulder 20 lying against the outer side of the ball bearing 12 and the shoulder 21 having a thrust collar 22 lying thereagainst and in abutment with the outer side of a ball bearing 17 of the gear 16. This thrust collar 22 and abutment 21 prevent outward longitudinal displacement of the gear 16 to the right on the shaft. The other abutment 20 prevents longitudinal displacement of the shaft in its bearings to the left.

The headed end of the tubular driven shaft is closed by means of a screw plug 23 and a radial oil hole 24 is provided extending to the central bore of the driven shaft. Oil is delivered to the shaft interior through this hole 24 by way of an oil line connecting to the bearing portion of the shaft and emptying into the space between oil sealing rings 25—25, one at each side of the oil hole including packing for preventing leakage from the clutch casing along the driven shaft bore. These oil sealing rings are contained within a sleeve 26 which is fixed in the bearing portion of the casing and maintains the bearing 12 against a shoulder 27 of the casing preventing longitudinal displacement of this bearing.

The spacer sleeve 18 also serves as a retainer for a split ring 18ª which is contained in an annular groove in the shaft and projects into a counterturned bore portion of the sleeve at the end thereof toward the shoulder 20. The split ring 18ª and the shoulder 20 prevent any longitudinal displacement of the shaft for the reason that the shoulder 20 lies against the side of the bearing 12 fixed in the casing and the split ring lies against the side of one of the bearings 17 which mounts the gear 16. The bearings 12 and 17 being interposed between these abutment elements, the gear 16 is maintained against the thrust collar 22 and bearing 12 and the gear 16 is fixed against longitudinal displacement in either direction.

The driving gear 13 has a pulley 29 keyed to the hub thereof and is held in place against the inner race of the bearing 14 by means of a cap 30 screwed on the hub of the gear and abutting the pulley hub. This cap also functions as a cover for the clutch adjusting means.

The bearing 14 lies within the counterbored portion of the bore of a bearing element 31 attached to the end of the casing 10 by means of screws 32. The bearing is held against the end of the counterturned portion or abutment 33 by means of a sleeve 34 fixed in the counterbore by means of screws 35, this sleeve overhanging the inner hub of the driving pulley and the adjacent surfaces of these parts including oil grooves for preventing passage of oil from the casing.

For one direction of rotation the drive connection is directly from the gear 13 carrying the pulley 29 through the clutch to the driven sleeve or shaft 11. For the other direction of rotation the drive is through the driving gear 13 and through an intermediate shaft and reversing gear to the driving gear 16 and thence through the clutch to the driven sleeve or shaft 11. For this purpose (see Figure 7) reversing gear 36 is keyed on a reversing shaft 37 journalled in ball bearings 41 (see Figure 7) in and between the end walls of the casing. This shaft 37 carries another gear 38 fixed thereto. The gear 38 is in mesh with a wide gear 39 in mesh with the gear 13, this gear 39 being fixed on a shaft 40 journalled in ball bearings 41 in the end walls of the casing.

The gear 39 is broad enough for engagement by gears 13 and 38, as disposed side by side. All of the gears of this transmission are helical for the purpose of quieting the drive inasmuch as a greater area of tooth engagement is obtained. In this installation the gears 13 and 16 being large and the pinions of the reversing shafting being considerably smaller, the result is that these reversing shafts are driven at high rates of speed and would tend to vibrate, resulting in undue noise and detriment to the gears.

Upon alternate connection of the respective gears 13 and 16 to the driven shaft or sleeve, reverse directions of drive occur because of the idler gearing and shafting interposed in the transmission between these gears for reversing the direction of drive to the respective gears 13 and 16.

The oil fed into the hollow shaft passes to the bearings 17 between the same by way of radial apertures 24ª and a circumferential groove 24ᵇ in the shaft and radial apertures in the sleeve 18, and to the clutch plates by way of radial apertures 24ᶜ and longitudinal grooves 24ᵈ in the shaft exterior.

*Clutch construction*

A clutch body 42 is secured upon the driven sleeve or shaft 11 between the gears 13 and 16 by means of a cross pin 43 (see Figure 1), preventing longitudinal and rotative displacement. Between each gear, namely 13 and 16, and the adjacent side of the clutch body 42, a series of friction clutch plates 45 are interposed. Alternate plates of each group are fixed for rotation with the respective adjacent gear and the remaining plates of each group are fixed to the driven shaft 11.

In the instance of the last mentioned plates, a connection is accomplished by the engagement of notches 46 in the bores of the discs or clutch plates 45 with keys 44 disposed along the driven sleeve for splining these plates to the driven shaft. In the instance of the plates attached to the gears 13 and 16, a plurality of slots 48 are cut longitudinally in the sleeve extensions of the gears and lugs 49 of the plates engage in these slots for a splined connection. At the inner and outer side of each set of clutch plates a thrust plate or washer 50 is slidably mounted upon the driven sleeve and keyed thereto by means of the keys 44. The keys 44 also serve as means for additionally attaching the clutch body on the driven shaft since the keys are extended into keyways in the clutch body.

The clutch elements for frictionally engaging the clutch plates and driving the gears are included in the stationary body 42 fixed to the sleeve. A shiftable collar 51 surrounding the stationary body is slidably mounted thereon for movement axially thereof for shifting and actuating the clutch elements. These clutch elements are mounted within the clutch body and consist of a plurality of fingers 52. These fingers, of which there are four, are arranged in sets of two each for frictionally engaging the groups of plates at the respective sides of the clutch body. The fingers are each mounted for pivotal movement in a radial direction relative to the driven shaft and clutch body on pivot pins 53 and move within radial slots 54 in the outer periphery of the clutch body.

The fingers of each group of two are disposed diametrically and are at right angles to the elements of the other set or group. One end of each finger bears against the adjacent thrust plate or washer 50 of the clutch and includes a rounded tip 55 for permitting an easy sliding movement of the end of the finger against the plate. The opposite end of each finger extends substantially parallel with the driven sleeve and includes an outwardly formed tip 56 disposed beyond the confines of the clutch body when in unclutching position.

These tips 56 are disposed within slots 57 in the adjacent ends of the bore of the shiftable clutch element and each bears against an inclined wall of the particular slot. The groups of two fingers each are arranged in opposite directions for engaging the respective clutch plates.

The position described for these fingers is the neutral transmission position assumed when the shiftable element 51 is in central position. As the shiftable element is moved in either direction, two of the fingers are rocked on their pivots due to the forced engagement between the inclined end walls of the particular slots and the extended tips of the levers. The thrust plates are thereby forcibly engaged by the adjacent finger ends and urged against the clutch plates for clutching the adjacent gear and rotatably connecting the same to the fixed clutch body and the driven sleeve or shaft.

*Clutch shifting and driven shaft braking mechanism*

The means for actuating the shiftable clutch element 51 for moving it in opposite directions and reversing the drive to the driven shaft or sleeve includes a brake for smoothly stopping rotation of the clutch element and the driven sleeve after the power source has been unclutched. This momentum or free running of the sleeve must be quickly stopped so that the opposite direction of drive may be immediately started without throwing undue load upon the clutch plates and parts such as would occur if the reverse plates were frictionally engaged for one direction while the driven sleeve was rotating in an opposite direction. It is, therefore, arranged that the operator may move the control lever from forward to reverse in one continued movement, due to the action of the brake at the intermediate phase of movement.

A double lever arrangement for sliding the shiftable clutch lever and operating the brake includes two semicircular or yoke-shaped levers 58 and 59, the first or outer of which has its respective ends rotatably journalled in the walls of the casing and the second or inner of which has its respective ends rotatably mounted in the extended ends of the first mentioned lever.

The inner lever moves within an annular groove 60 in the outer face of the shiftable clutch element 51 and includes a semicircular brake band 61 fixed to its inner side for engaging the bottom of the groove.

The outer swinging lever is mounted on roller bearings 63—63 on studs or trunnions 62—62 which are carried by the side walls of the casing. This outer swinging yoke lever is operated by means of a rod 64, this rod being tubular and extending into the clutch casing, in this instance, from adjacent mechanisms exteriorly of the clutch housing. The tubular rod is connected to the yoke at an intermediate point thereof by means of a universal connection. A lug 65 extends upwardly from the intermediate point of the yoke and a ball stud 66 is fixed laterally in the lug, the ball thereof being disposed at the side of the lug 65. The stud has a tapered fit in the lug and a nut screw-threaded on the small end thereof fixes the stud in the lug.

The ball of the stud is snugly disposed between ball seats 67—67 screwed into the screw-threaded interior at the end of the rod, these seats being maintained in position by means of cross pins 68 disposed through diametric slots 69 of the seats.

Movement of the rod translatably, therefore, rocks the yoke lever 58 on its aligned trunnions. The mounted ends of the yoke or semicircular lever 58 extend below the trunnions 62—62 and have studs 70 mounted therein extending inwardly or toward each other, these studs being fixed in the lever 58. The extended ends of the studs rotatably mount journal or slide blocks 71, the slide blocks being vertically slidably mounted in slots 72 in the ends of the inner yoke-shaped lever 59. These slide blocks are engaged by springs 73 under compression for forcing the lever 59 downwardly, the springs being disposed within bores 74 of the yoke and maintained in place by means of plugs 75 screwed into the lower end of the bore. The plugs are fixed in position by means of diametrically disposed cotter pins 76.

By virtue of the location of the pivot studs 70 connecting the inner yoke lever 59 to the outer yoke lever 58 below the trunnions 62 of the outer yoke lever, movement of the outer yoke lever on its trunnions shifts the inner yoke lever longitudinally of the axes of the driven shaft and the clutch body, the inner yoke lever 59 being disposed within the peripheral groove 60 in the shiftable clutch element 51. The effect of this longitudinal shifting of the yoke lever is to move the shiftable clutch element.

It will also be observed that as the operating lever is moved to one side or the other from a central or intermediate position, the pivotal mounting for the inner yoke lever is elevated being swung in an arc described from the center of the outer yoke trunnions or pivots. The effect of this is to raise the brake band from contact with the base of the annular groove 60 of the shiftable clutch element, toward the limits of swing of the pivot pins 70.

Since the pivot pins 70 of the inner yoke lever are disposed in the floating blocks under spring compression upwardly, the release of the brake from contact with its braking surface is gradual and for the same reason the application of the brake is gradual. Therefore, as the outer yoke lever 58 is swung on its trunnions to either side, the inner yoke lever in engagement with the shiftable clutch element, shifts the same through its engagement with the sides of the groove 60 and at the same time, moves relatively to the shiftable clutch element in a direction outwardly of the groove.

It will be observed that the springs under compression are effective for moving the slide blocks in their slots during a portion of these reverse clutching movements until the blocks engage the upper ends of the slots at which time the motion is transmitted to the brake lever 59 and the brake band of the yoke lever 59 clears the braking surface. At these times the particular driving gear is clutched to a motionless sleeve or driven shaft.

Clutch adjustment means

It is arranged that the adjustments for the clutch plates of either gear can be made from one end of the mechanism. Referring to Figure 6, it will be noted that an adjustment rod 77 is slidably mounted in the tubular driven shaft, this rod including a bearing portion 78 at each end thereof within the driven shaft. The inner end of this rod is disposed adjacent the clutch plates for the gear 16 and the bearing portion thereof includes cross grooves 79 cut in opposite sides thereof. The shoulders 80 formed by these grooves engage the outer ends of keys 44. The keys 44 are mounted in longitudinal grooves 82 in the outer face of the driven shaft and have been previously described as keys for locking a set of the clutch plates to the driven shaft.

Each key 44 at the clutch plates for the gear 16 includes a radially disposed head 83 disposed through slots 84 in the driven shaft, these heads extending into the grooves cut in the rod and providing the aforesaid engagement with shoulders 80. Shoulders 85 formed by the head of the keys at the outer sides of the keys abut the thrust plate or washer 50 of the clutch plate assembly. The slots 84 provide ample clearance for longitudinal movement of the keys against the clutch plate or washer above mentioned.

The outer end of the rod 77 is screw-threaded and a nut 86 is engaged thereon, abutting against the outer end of the driven shaft. As this nut is taken up, the rod will be drawn toward the end of the driven shaft, sliding the keys 44 in their keyways and moving the clutch plates on their splined connection closer together by the engagement of the shoulders of the keys with the outer thrust plate of the clutch assembly. The keys extend into the clutch body and further aid in maintaining the rotative attachment of the clutch body on the driven shaft. By this means it is possible to adjust the spacing of the plates for a more efficient and quicker action of the clutch.

The clutch plates for the gear 13 are adjusted through the following means. The gear 13 is rigidly fixed to the pulley and held against longitudinal displacement of any sort. Between the bearings 15—15 of the gear 13, a spacer sleeve 87 is mounted on the driven shaft. A clearance is provided at 88 in back of the outer bearing 15 permitting sliding movement of this bearing and likewise the counterturning of the driven shaft extends far enough back as at 89 to further clear this bearing.

The nut 28 is screw-threaded on the end of the driven shaft against the outer bearing 15. When it is desired to adjust the clutch plates of the gear 13, the operator screws the nut up on the shaft, forcing the outer bearing 15, spacer sleeve 86, inner bearing 15, along the driven shaft and against the outer thrust washer 50 of the clutch plate assembly, thus moving the plates close together. The adjustment nuts 28, 86, are disposed adjacently at the same end of the driven shaft and the closure cap or hub 30 is screwed onto the screw-threaded outer end of the gear 13 and against the hub of the pulley, thereby housing the adjustment nuts.

General description of operation

Assuming the reversing gearing to be in neutral position, the power being effective to rotate pulley 29, this motion rotates the gear 13 in the same direction as the pulley. Through the intermediate shafts 37, 40 and gearing 39, 38 and 36, the gear 16 is rotated in a reverse direction. The gears 13 and 16 are, therefore, constantly rotating in reverse directions when the pulley is being rotated.

The operator, for either direction of rotation for the driven shaft moves the rod 64 in the appropriate direction by movement of a hand lever not shown. This rocks the yoke lever 58 on its trunnions, and swings the pivot pins 70 connected to the yoke 58 in an arc described from the bearing axes of the yoke. When the hand lever or rod 64 is in neutral position, the axes of the trunnions and pivot pins are vertically aligned and the inner yoke element 59 has been forced downwardly to the fullest extent. Therefore, at this neutral position the brake band 61 is engaging the bottom of the groove 60 in the shiftable clutch element firmly holding this element in stationary position. As the movement of the pivot pins 70 takes place, the shiftable clutch element is moved toward one gear or the other being slid on the clutch body 42 for depressing the particular set of two fingers 52 and engaging the clutch plates 49 together for coupling the particular gear to the driven shaft.

Prior to the frictional bind between the plates, the inner yoke element 59 has been elevated relative to the shiftable clutch element 51 to lift the brake band from contact with the shiftable clutch element 51, the sides of the inner yoke element 59 still continuing to engage the sides of the groove for continued shifting of the shiftable clutch element. The floating blocks 71 journalling on the pivot pins of the outer yoke element provide that the brake is released gradually and the abutment of the blocks with the ends of the grooves lifts the braking band of the inner yoke lever 59 from contact with the shiftable element 51. The hand lever may then be released, the shiftable clutch element remaining in off-set relation for a clutched drive.

If the operator should desire to quickly reverse the drive, he translates the rod and moves the outer yoke lever from one side to the other as rapidly as possible through the neutral or intermediate position without damage to the mechanism since a full braking action occurs on the driven shaft as the shift passes through the intermediate position. It will be seen that the application of the brake is gradual due to the fact that, first of all, the brake band is lowered into contact with the braking surface and upon continued swing of the pivot pins 70 mounting the inner yoke lever, the slide blocks 71 move against the compression springs urging the brake under spring pressure against the braking surface, this pressure being greatest when the pivot pins and trunnions are in vertical alignment at exactly intermediate position. Thus in a rapid reversal of drive, both the application and release of the brake are gradual operations occurring automatically or as the lever is swung from one driving position to the reverse driving position.

Having described my invention, I claim:

1. In a reversing clutch, a driven shaft, spaced apart gears loosely rotatively mounted on said shaft and fixed against longitudinal movement, a transmission for driving said gears in reverse directions, a clutch fixed to said driven shaft between said gears, a series of clutch plates between each gear and the clutch, operative means in the clutch for alternately frictionally engaging the clutch plates at the respective sides of the clutch for coupling said driven shaft to the gears, clutch plate spacing elements extended along said driven shaft and having their ends exteriorly disposed at the same end of the shaft, and adjustment elements disposed at the exteriorly disposed ends of the spacing elements for operating said clutch plate spacing elements.

2. In a reversing clutch, a hollow driven shaft, spaced apart gears loosely rotatively mounted on said shaft and fixed against longitudinal displacement, a transmission for driving said gears in reverse directions, a clutch mounted on said driven shaft between said gears, a set of clutch plates between each gear and the clutch, operative means in the clutch for alternately frictionally engaging the clutch plates at the respective sides of the clutch for coupling said driven shaft to the particular gears, a clutch plate spacing rod for one set of clutch plates disposed longitudinally within the driven shaft, a clutch plate spacing sleeve for the other set of clutch plates disposed longitudinally about the driven shaft, said rod and sleeve extended to one end of said shaft, and adjustment elements disposed at said end of the shaft for translating said rod and sleeve and spacing said clutch plates.

3. In a reversing clutch unit, a driven shaft, spaced apart gears loosely rotatively mounted on said shaft and secured against longitudinal displacement, a transmission for driving said gears in reverse directions, a clutch fixed to said driven shaft between said gears, a set of clutch plates between each gear and the clutch, operative means in the clutch for alternately frictionally engaging the clutch plates at the respective sides of the clutch for coupling said driven shaft to the particular gears, an independent clutch plate spacing element for each set of clutch plates extended exteriorly of said clutch at the same end of said driven shaft, and adjustment elements for the clutch plate spacing elements at the exteriorly disposed ends thereof.

4. In a reversing clutch, a tubular driven shaft, reversely driven spaced apart longitudinally fixed gears loosely mounted on said shaft, a clutch body fixed to the shaft against rotative or longitudinal displacement, a set of clutch plates interposed between said clutch body and each gear, means on the clutch body for operating the clutch plates for alternately connecting the gears to the clutch body, a rod disposed within the tubular shaft and extending beyond one end thereof, said shaft having slots in its walls, lateral projections carried by said rod and extending through said slots in the shaft, said projections disposed in engagement with the endmost clutch plate of one set, a nut on the extended end of the rod adapted to draw the rod toward that end of the shaft and the clutch plates closer to the clutch body, elements spaced along the exterior of the tubular shaft and engaging the outer plate of the other set of clutch plates, and a nut screw-threaded on the shaft adapted to move said elements along the shaft against the clutch plates toward the clutch body.

5. In a reversing gearing, a casing, a driven shaft mounted in said casing, abutment means for preventing axial movement of said shaft, spaced apart gears mounted coaxially of said shaft and sustained against longitudinal movement, means for driving said gears in reverse directions, a clutch mounted as a fixed unitary part of said driven shaft between said gears, sets of clutch discs interposed between said clutch and said gears, said sets alternately rotatively connected to the driven shaft and to the gears, operating means in the clutch for alternately frictionally engaging the clutch disc sets, and a coaxially extended clutch disc spacing device for each set of clutch discs, said devices accessibly disposed for adjustment at a common end of said driven shaft.

WILLIAM G. HOELSCHER.